(12) United States Patent
Adogla et al.

(10) Patent No.: US 8,788,663 B1
(45) Date of Patent: Jul. 22, 2014

(54) MANAGING RESOURCE DEPENDENT WORKFLOWS

(75) Inventors: Eden G. Adogla, Seattle, WA (US); Jamin W. Collins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 81 days.

(21) Appl. No.: 13/331,993

(22) Filed: Dec. 20, 2011

(51) Int. Cl.
  *G06F 15/173* (2006.01)
(52) U.S. Cl.
  USPC .......................... 709/225; 709/229; 718/102
(58) Field of Classification Search
  USPC .......... 709/223, 224, 225, 227, 229; 718/100, 718/102, 104
  See application file for complete search history.

(56) References Cited

U.S. PATENT DOCUMENTS

| | | | |
|---|---|---|---|
| 5,754,857 A | 5/1998 | Gadol | |
| 6,707,903 B2 * | 3/2004 | Burok et al. | 379/265.02 |
| 7,555,515 B1 | 6/2009 | Roy et al. | |
| 7,917,906 B2 * | 3/2011 | Walker | 718/104 |
| 7,962,385 B2 | 6/2011 | Falk et al. | |
| 8,185,463 B1 | 5/2012 | Ball | |
| 2004/0111302 A1 | 6/2004 | Falk et al. | |
| 2005/0010454 A1 | 1/2005 | Falk et al. | |
| 2005/0038776 A1 | 2/2005 | Cyrus et al. | |
| 2005/0071843 A1 * | 3/2005 | Guo et al. | 718/101 |
| 2007/0038494 A1 | 2/2007 | Kreitzberg et al. | |
| 2008/0144529 A1 | 6/2008 | McKee et al. | |
| 2008/0172673 A1 | 7/2008 | Naik | |
| 2008/0201191 A1 * | 8/2008 | Carter | 705/8 |
| 2009/0077248 A1 | 3/2009 | Castellucci et al. | |
| 2009/0164649 A1 | 6/2009 | Kawato | |
| 2010/0305997 A1 | 12/2010 | Ananian et al. | |
| 2011/0093852 A1 | 4/2011 | Li et al. | |
| 2011/0119358 A1 | 5/2011 | Woodward | |
| 2011/0131448 A1 | 6/2011 | Vasil et al. | |
| 2011/0161219 A1 | 6/2011 | Robertson, II | |
| 2011/0161391 A1 | 6/2011 | Araujo et al. | |
| 2011/0276748 A1 | 11/2011 | Toyama et al. | |
| 2011/0321051 A1 * | 12/2011 | Rastogi | 718/102 |
| 2012/0016981 A1 * | 1/2012 | Clemm et al. | 709/224 |
| 2012/0089570 A1 | 4/2012 | Zha et al. | |
| 2012/0102134 A1 | 4/2012 | Burckart et al. | |
| 2012/0137367 A1 | 5/2012 | Dupont et al. | |
| 2012/0290865 A1 | 11/2012 | Kansal et al. | |
| 2013/0086116 A1 | 4/2013 | Agarwal et al. | |
| 2013/0097706 A1 | 4/2013 | Titonis et al. | |
| 2013/0198386 A1 | 8/2013 | Srikanth et al. | |

* cited by examiner

*Primary Examiner* — Viet Vu
(74) *Attorney, Agent, or Firm* — Knobbe, Martens, Olson & Bear, LLP

(57) ABSTRACT

Systems and method for the management of resource dependent workflows are provided. One or more resource control devices monitor usage of a computing resource by server computing devices. Each resource control device may direct a server computing device to proceed with a workflow or to pause processing a workflow. A resource control device may further direct a server computing device to take resource conserving actions. When a computing resource is determined to be available, a resource control device may direct a paused server computing device to resume a workflow.

21 Claims, 8 Drawing Sheets

MANAGING RESOURCE DEPENDENT WORKFLOWS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Computing systems within a data center may process workflows in order to perform various tasks or functions. Processing of these workflows may require access to computing resource either within or outside of the data center. In some instances, these computing resources may be limited, such that they may only be accessed by a limited number of computing systems at any given point in time.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
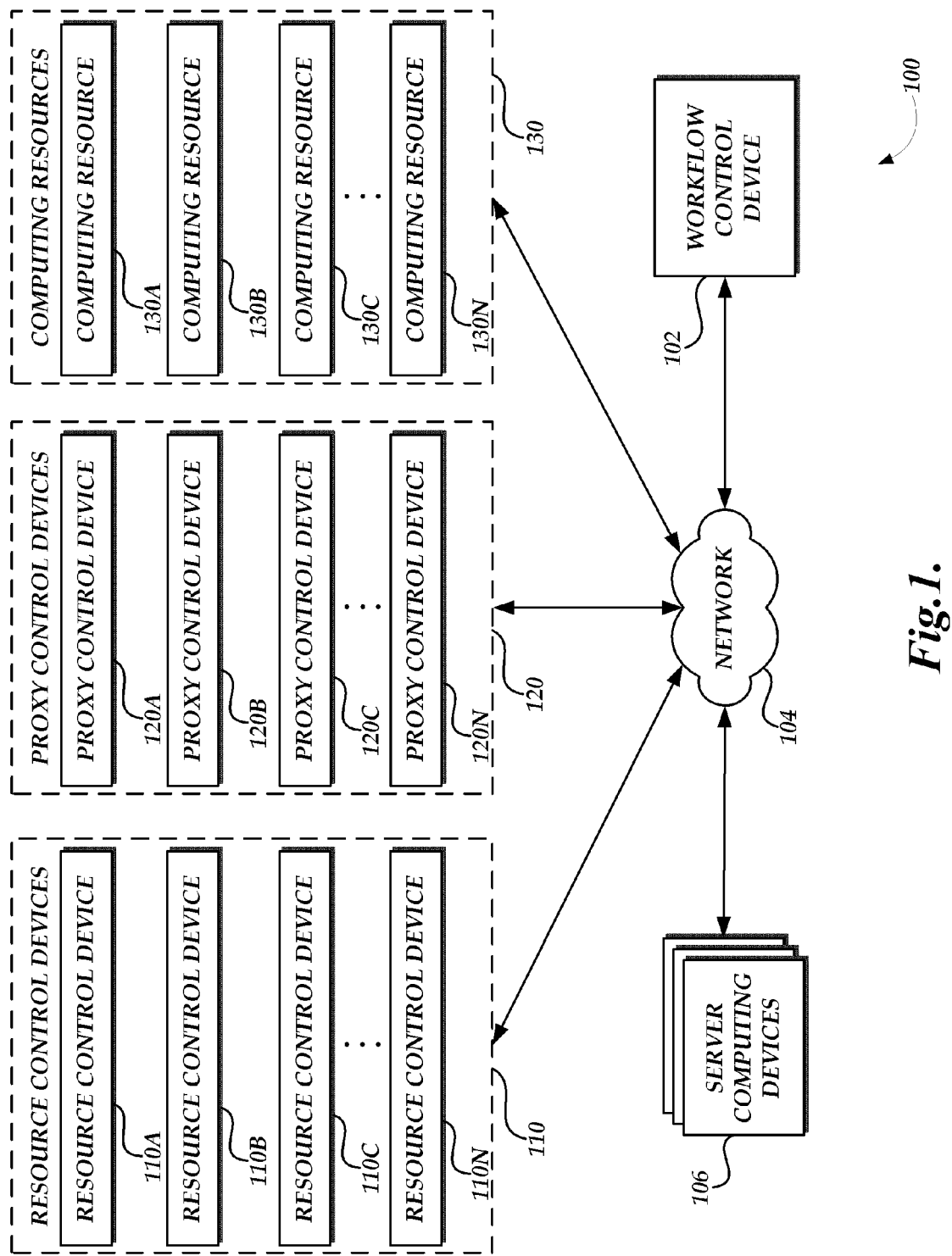
FIG. 1 is a block diagram illustrating an embodiment of a workflow group having server computing devices, a workflow control device, resource control devices, proxy control devices, and computing resources.

Generally described, aspects of the present disclosure relate to the management of resource-dependent workflows. Specifically, systems and methods are disclosed which facilitate management of computing devices processing workflows that are dependent on limited computing resources. In one aspect, each computing resource is associated with a resource control device. Each resource control device monitors use of the computing resource, and determines whether the computing resource is available for use. When a server computing resource processes a workflow or a stage of a workflow that requires access to a computing resource, it may request access to the computing resource from an associated resource control device. Based on monitored use of the computing resource, the resource control device may grant access to the computing resource, or may direct the server computing device to pause or delay processing of the workflow or workflow stage. In some embodiments, the resource control device may instruct the server computing device to take a responsive action, such as disabling functionality of the server computing device in order to reduce power consumption, or entering into a defined processing state.

In some embodiments, multiple workflow processing states may be defined which correspond to various responsive actions. For example, a first workflow processing state may be associated with accessing the computing resource and continuing to process a workflow or workflow stage. A second workflow processing state may be associated with halting or temporarily halting processing of the workflow or workflow stage. A third workflow processing state may be associated with halting or temporarily halting the workflow or workflow stage and reducing the functionality or power consumption of the computing device. A fourth workflow processing state may be associated with powering down the computing device. One or more of the above workflow processing states may further be associated with repeatedly sending a status indicator to a resource control device. For example, if a server computing device is instructed to halt processing of a workflow state, it may further be instructed to send periodic status updates to the computing resource controller indicating that it is waiting on access to a computing resource. In some embodiments, the computing resource controller is configured to grant access to the computing resource to the server computing device after the computing resource becomes available.

In some embodiments, computing resources may further be associated with proxy control devices. Illustratively, if multiple server computing devices are requesting access to a computing resource from a corresponding resource control device or transmitting status updates to that resource control device, the resource control device may not be able to respond to each server computing device. In these embodiments, a proxy control device may be configured to receive requests to access a computing resource, or to receive status updates, and to forward those updates to the resource control device. Such proxy control devices may be beneficial in situations where a resource control device cannot be reached, since they may allow a server computing resource to stop attempting to communicate directly with the resource control device. For example, such attempted communication may itself contribute to overloading the resource control device. In some embodiments, a server computing device may attempt to contact a proxy control device after a threshold number of attempts to contact a resource control device fail. In other embodiments, communication may be attempted to a proxy control device after a specified period of time without a response from a resource control device. In still more embodiments, server computing devices may attempt to contact a proxy control device first, and only contact a resource control device directly if such attempts fail.

A server computing device may be configured to interact with a resource control device through a variety of implementations. For example, software executed by the server computing device may be configured to process workflows by interaction with resource control devices. Such software may correspond, by way of non-limiting example, to an operating system or an application executing on a server control device. In other implementations, hardware of a server computing device may be modified in order to process workflows via interaction with resource control devices.

In some embodiments, software for processing resource-dependent workflows may be placed on a storage device of a server computing device, and the server computing device may be configured to execute this software on start up. In some embodiments, this storage device may correspond to permanent or semi-permanent storage integrated within the server computing device, or to network accessible storage. In other embodiments, this storage may correspond to removable or temporary storage, such as a universal serial bus (USB) connected storage device. Illustratively, a USB storage device may be connected to a server computing device during an initial boot process. The server computing device may be configured to load the software included on the USB storage device. This software, in turn, may direct the server computing device to contact a workflow control device to request a workflow, and thereafter to process the workflow by interaction with resource control devices. In addition, the software may be configured to allow the server computing device to discover available workflow control devices and resource control devices.

In other embodiments, software for processing resource-dependent workflows may be obtained and executed by a server computing device through use of a preboot execution environment (PXE). Routines, processes, and implementations of a PXE are well known in the art and will therefore not be discussed in detail herein. Generally, a PXE allows a computing device to request boot information via a network interface, independent of locally attached storage devices. Using a PXE boot process, a server computing device may request software which is configured to request a workflow from a workflow control device and process that workflow by interaction with resource control devices. As noted above, the software may be further enable the server computing device to discover appropriate or available workflow control devices and resource control devices.

In still more embodiments, the hardware or firmware of a server computing device may be configured to discover workflow control devices and resource control devices, and to process workflows by interaction with these devices. For example, a network interface which would normally execute a general PXE boot routine may be modified in order to include software for processing workflows via interaction with workflow control devices and resource control devices. Illustratively, such software could be placed into read only memory (ROM) of a network interface or a PXE device. In some embodiments, other hardware, firmware, or ROM of a server computing device may be modified in order to contain appropriate software or instructions.

In some embodiments, workflow control devices or resource control devices may be configured to receive information regarding server computing devices without requiring modification of the server computing devices. For example, server computing devices may be configured to use dynamic host configuration protocol (DHCP) in order to obtain an internet protocol (IP) address on boot. The DHCP server device may be in communication with a workflow control device, a resource control device, or both. After receiving a DHCP request from a server computing device, the DHCP server may alert workflow control devices and resource control devices that the server computing device will soon be requesting a workflow. In these embodiments, either or both of the workflow control devices or the resource control devices may prepare to receive such requests. For example, when it is expected that a server computing device will request a certain computing resource, the resource control device may begin to make that computing resource available for use.

In some embodiments, the server computing device may be configured to interact with a resource control device at various times during an initialization process (sometimes referred to herein as a "boot" or "boot up" process). For example, where software for implementing resource-dependent workflows is embedded in a ROM of a computing device, the device may be programmed to process workflows during a very early stage of a boot process, such as when loading instructions to implement a PXE boot. Where such software is contained on a data store, such as a PXE server or a USB data store, the computing device may implement software for processing resource dependent workflows at any point subsequent to receiving the software from the data store, such as prior to loading the final operating system of the computing device. Further, a computing device may be configured to process resource dependent workflows according to the present disclosure during initialization of a network device, such as in response to a DHCP request. As will be appreciated by one skilled in the art, implementation of resource dependent workflows may occur at any point during initialization or after a computing device has initialized.

As described above, in some instances, a computing resource may not be available when required by a server computing device. In such instances, a server computing device may be instructed to pause or delay processing a workflow or workflow stage. In some embodiments, a server computing device may be further configured to repeatedly transmit a status indicator to a resource control device. For example, the status indicator may reflect that the server computing device is waiting on a specific computing resource, or that the server computing device has taken other responsive actions (e.g., reducing functionality or power consumption). Various mechanisms may be used to transmit such status indicators. In one embodiment, server computing devices may transmit Internet Control Message Protocol (ICMP) echo request packets to a resource control device as a status indicator. Transmission of such packets, also known as "pinging", may be used to indicate that the server computing device is awaiting access to a computing resource corresponding to the resource control device.

In some embodiments, resource control devices or workflow control devices may be configured to record computing resource access history and timing or metrics associated with computing resource access. For example, resource control devices may record the number, type, or identity of server computing devices requesting access to a computing resource and the response time and availability of a computing resource under various historical conditions. A workflow control device may record the number of computing devices processing a workflow or workflow stage, the types or resources those workflows are dependent on, and the timing or success rate of these workflows or stages. This historical data may be used in order to more efficiently manage resource availability or process workflows. For example, historical data may indicate the capacity of a computing resource control under various conditions, or the amount of capacity of a computing resource required in order to process a particular workflow or workflow stage.

Though described above with reference to an individual workflow group above, in some embodiments, multiple workflow groups may be in communication and interact to manage workflows. For example, a resource control device from a first group A may determine that a computing resource X is overloaded or in danger of becoming overloaded. A second group B may include similar computing resources which could be accessed by server computing devices of group A in order to reduce the load on the computing resource X. As such, the server computing devices of group A may request access to the resources of group B. In this manner, multiple workflow groups may interact to manage workflows across these groups. In some embodiments, multiple workflow groups may be configured to collectively decide mitigating actions to take when one or more workflow groups require access to resources from other workflow groups. For instance, resource control devices from multiple workflow groups may implement distributed decision-making techniques to propose and implement mitigation techniques. For example, resource control devices from various workflow groups which manage interchangeable computing resources may form a resource "council" corresponding to that computing resource. When a computing resource from a first group is in danger of being overloaded, the corresponding resource control device may propose to the council that other computing resources from other groups be used to offset the load of the first group. Collectively, the council may decide whether to allow offloading of the load, and to which computing resource the load should be transferred. In some embodiments, a human operator may be required to confirm such decisions before they are implemented.

In some embodiments, workflow groups may correspond to regions in which the workflow groups are located. For example, a first workflow group may be located in a first city, while a second workflow group may be located in a second city. In general, each workflow group may be autonomous, and be able to function without requiring interaction with other workflow groups. However, interaction with workflow groups may be beneficial in situations where an unexpected or infrequent event occurs that is localized to a single workflow group, such as a power outage or natural disaster.

Specific embodiments and example applications of the present disclosure will now be described with reference to the drawings. These embodiments and example applications are intended to illustrate, and not limit, the present disclosure.

FIG. 1 is a block diagram illustrating an embodiment of a workflow group environment 100 including multiple server computing devices 106 in communication with a workflow control device 102 and a number of computing resources 130 via a network 104. Illustratively, a workflow group may include any number N of computing resources 130. As shown in FIG. 1, this illustrative workflow group contains computing resources 130A-130N. Each computing resource 130 may be associated with a resource control device of resource control devices 110 and a proxy control device of proxy control devices 120. In this illustrative embodiment, computing resource 130A is associated with resource control device 110A and proxy control device 120A; computing resource 130B is associated with resource control device 110B and proxy control device 120B; et cetera.

Each of the server computing devices 106, the workflow control device 102, the resource control devices 110, the proxy control devices 120, and the computing resources 130 may be in communication over a network 104. Those skilled in the art will appreciate that the network 104 may be any wired network, wireless network or combination thereof. In addition, the network 104 may be a personal area network, local area network, wide area network, cable network, satellite network, cellular telephone network, or combination thereof. Protocols and components for communicating via any of the other aforementioned types of communication networks are well known to those skilled in the art of computer communications and thus, need not be described in more detail herein.

The workflow control device 102 may be configured to transmit workflows including one or more workflow stages to a server computing device 106, which may be configured to process the workflow. For example, a workflow may correspond to executing a task or routine, such as booting the server computing device, loading an application on the server computing device, processing data on the server computing device, or transmitting data to or from the server computing device. Illustratively, workflow stages within a workflow may be associated with access to a computing resource 130.

A computing resource 130 may correspond to any resource used to process a stage within a workflow. By way of non-limiting example, a computing resource may correspond to network accessible storage, to a database server, or to a web server. For example, where a workflow corresponds to booting the server computing device 106, a stage within the workflow may require access to a computing resource 130 corresponding to a network accessible storage device. This storage device may contain, for example, an operating system or portion of an operating system, applications, updates, device drivers, or other data.

In this illustrative embodiment, in order to access a computing resource 130, a server computing device 106 may request access from the associated resource control device 110. Illustratively, a server computing device 106 may be configured to interact with resource control devices 110 through a variety of mechanisms. As described above, in some embodiments, software for processing workflows via resource control devices 110 may be received via used of a PXE boot process. For example, such software could be contained within a software image obtained through a network interface of the server computing device. In some embodiments, use of a PXE boot process may include transferring of such software via trivial file transfer protocol. In some embodiments, software configuring a server computing device 106 to process workflows may be contained within storage attached either locally or remotely to the server computing device 106. By way of non-limiting example, such software may be contained within an USB storage drive attached to the server computing device, or contained within network accessible storage. In still more embodiments, instructions for processing a workflow may be included in hardware or firmware of the server computing device, such as in ROM. Illustratively, such ROM may be included in a network interface of the server computing device, in the basic input output system (BIOS) of the server computing device, in PXE implementation hardware, or in any other persistent memory of the server computing device 106. As used herein, a ROM may refer to any of a collection of computer storage media, including but not limited to programmable read-only memory (PROM), erasable programmable read-only memory (EPROM), and electrically erasable programmable read-only memory (EEPROM). Subsequent to configuring a server computing device 106 to process a workflow, the server computing device 106 may request access to a computing resource 130 from a resource control device 110.

The resource control device 110 is configured to monitor use of the computing resource 130, and determine whether access to the computing resource 130 should be granted to the computing device 106. Illustratively, access to a computing resource 130 may be denied when the computing resource 130 is already being used by a large number of other server computing devices 106. For example, where a computing resource 130 is able to serve ten simultaneous server computing devices 106, and an eleventh server computing device 106 requests access to the computing resource 130, the associated resource control device 110 may deny access to the computing resource 130. A number of metrics may be used by the resource control device 110 in order to determine whether a computing resource 130 is able to service an additional server computing device 106. By way of non-limiting example, the resource control device 110 may monitor the number of server computing device 106 accessing a computing resource 130, the network use or availability of the computing resource 130, the processing use or availability of the computing resource 130, volatile or non-volatile storage use or availability of the computing resource 130, or response time of the computing resource 130. Determination of the availability of a computing resource 130 will be discussed in more detail below.

If access to a computing resource 130 is granted to a server computing device 106 by an associated resource control device 110, the server computing device 106 may continue to process the workflow or workflow stage. However, if a computing resource 130 is not available, the resource control device 110 may instruct the server computing device 106 to halt processing of the workflow stage. In some embodiments, the server computing device 106 may further instruct the server computing device 106 to later transmit a status identifier to the resource control device 110, or to repeatedly transmit such a status identifier. By way of non-limiting example, such a status identifier may correspond to an ICMP echo request. One illustrative routine for processing a workflow stage that may be implemented by a server computing device will be described in more detail with reference to FIG. 3, below.

The illustrative environment of FIG. 1 may further include a number of proxy control devices 120, each of which may correspond to one or more resource control devices 110. Each proxy control device 120 may be configured to forward requests to access computing resource 130 that are received from server computing devices 106 to a corresponding resource control device 110. Illustratively, a server computing device 106 may be configured to transmit requests to a proxy control device 120 after multiple requests to a resource control device 110 have failed or been lost. In some embodiments, a server computing device 106 may be configured to transmit access requests to a proxy control device 120 before transmitting such requests to a resource control device. One illustrative interaction with a proxy control device 120 will be described in more detail with respect to FIG. 2B, below.

Figure 2A:
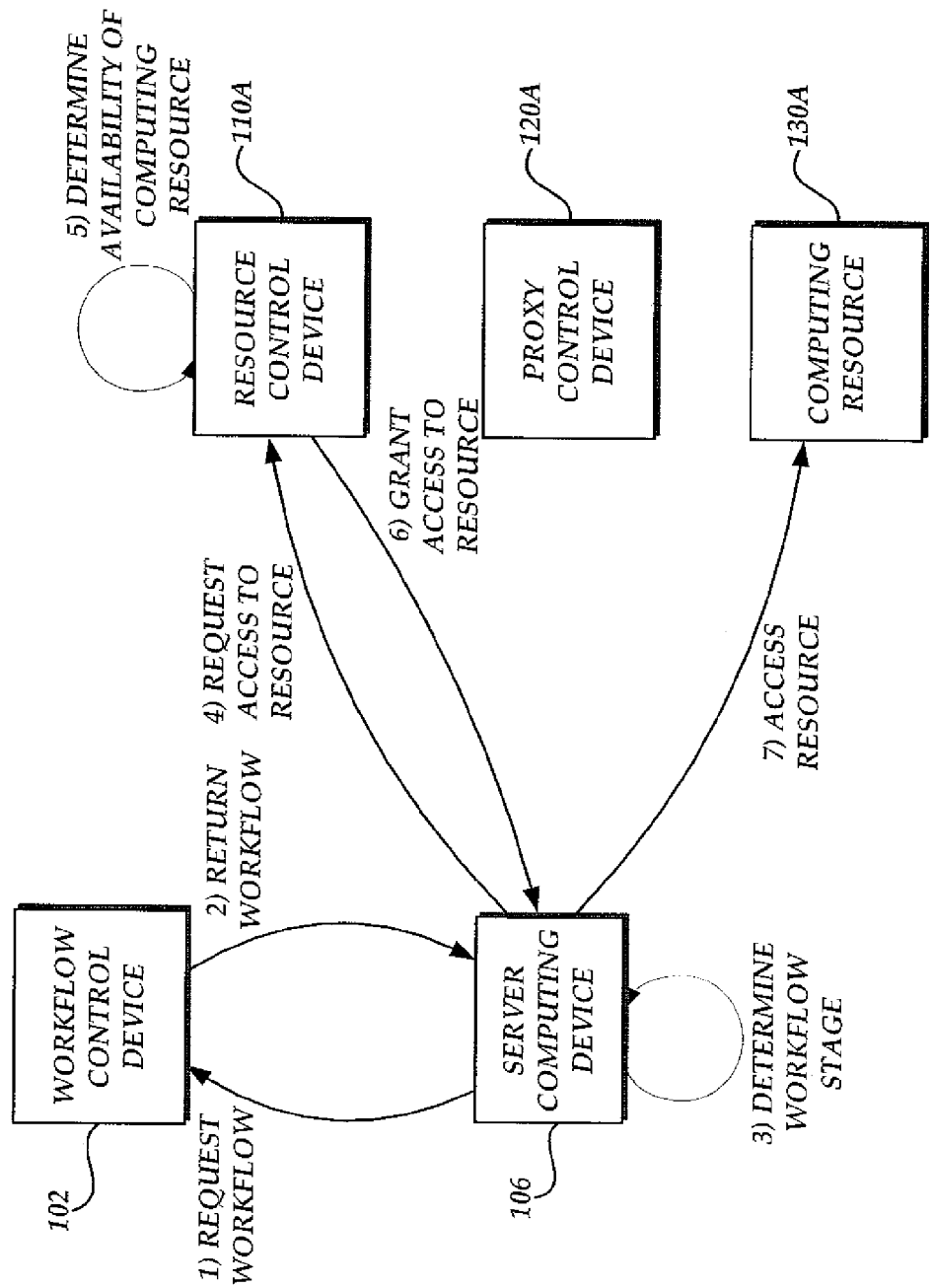
FIGS. 2A-2C are simplified block diagrams of the workflow group of FIG. 1 illustrating the management of a resource-dependent workflow executed by server computing devices.
Figure 2B:
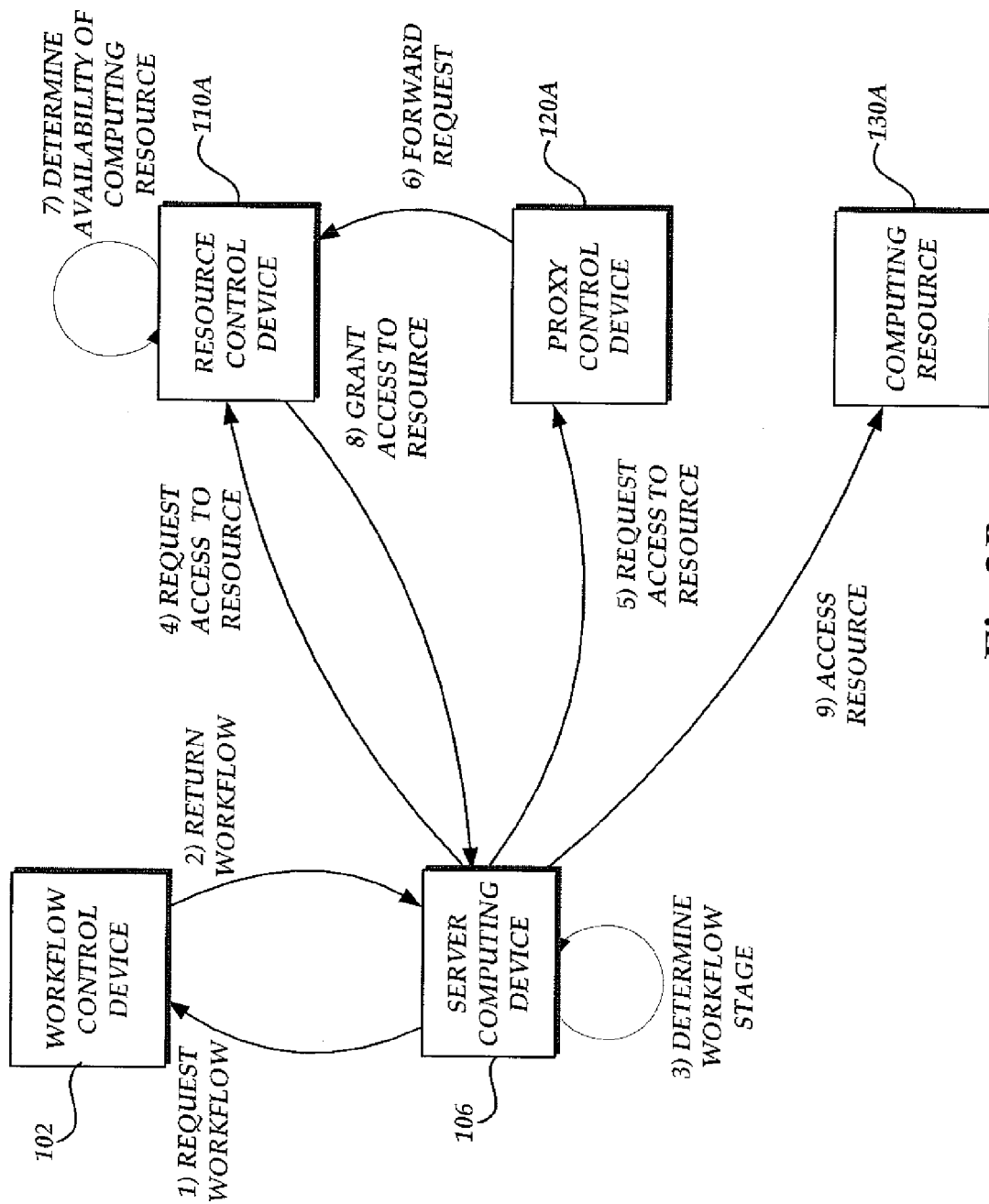
Figure 2C:
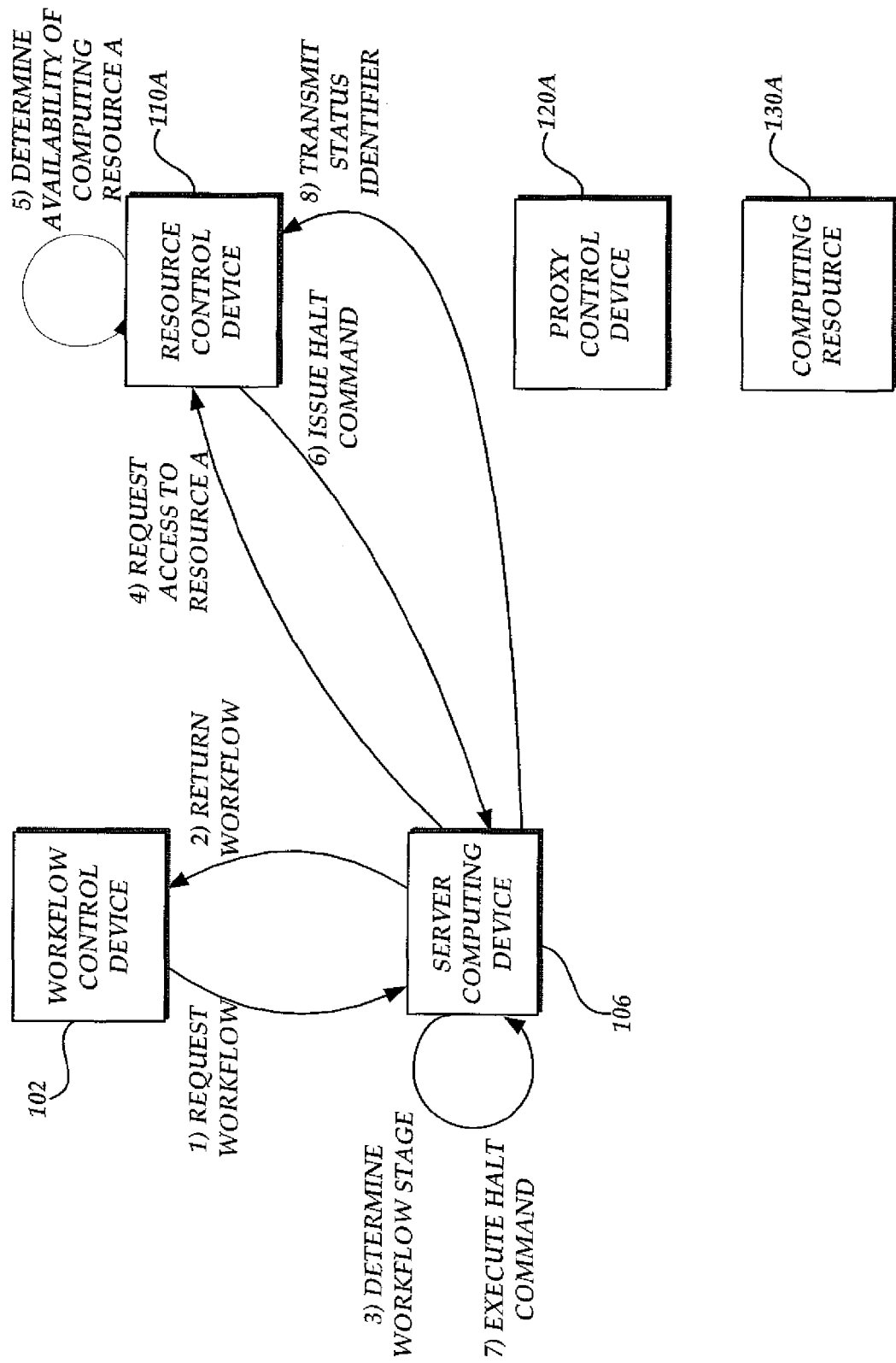

With reference now to FIGS. 2A-2C, simplified block diagrams are shown illustrating the processing of a resource-dependent workflow by a server computing device 106 of FIG. 1. Specifically, FIG. 2A illustrates an interaction in which access to a computing resource 130A is granted by a resource control device 110A. FIG. 2B illustrates an interaction similar to that illustrated in FIG. 2A, in which communication with a resource control device 130A occurs via a proxy control device 120A. FIG. 2C illustrates an interaction in which access to a computing resource 130A is not granted, and a server computing device 106 transmits a status identifier to the resource control device 110A indicating that is it awaiting access the computing resource 130A.

As shown in FIG. 2A, a server computing device 106 requests a workflow from a workflow control device 102. As described above, such a request may be facilitated by software included on a storage device, such as a USB storage device, retrieved via a PXE boot process, or included on ROM of the server computing device 106. Further, as described above, in some embodiments a request for a workflow may correspond to a DHCP request by the server computing device 106. For example, the server computing device 106 may, instead of being configured to explicitly request a workflow, be configured to request a DHCP address on initialization of a network interface. The corresponding DHCP server (not shown) may inform a workflow control device 102 that the server computing device 106 is ready to receive a workflow. As such, the workflow control device 102 may return a workflow to the server computing device 106. In some embodiments, the DHCP server may be implemented by the workflow control device 102. In some embodiments, a DHCP request may be transmitted during a PXE boot process. In other embodiments, a DHCP request may be transmitted from within an operating system.

In some embodiments, a DHCP request may include information corresponding to the server computing device 106, such as a media access control address of the server computing device 106. The workflow control device 102 may utilize this information to determine a workflow to transmit to the server computing device 106. For example, the workflow control device 102 may interact with a server computing device information data store (not shown) to determine other information regarding the server computing device 106, such as the hardware or software configuration of the server computing device 106 or the location of the server computing device 106. This information may be used to determine a workflow to assign to the server computing device 106. In some embodiments, the workflow control device 106 may further determine computing resources or software that may be required during a transmitted workflow process. In such embodiments, the workflow control device 106 may, alone or in conjunction with resource control devices 110, provision these computing resources or software such that they are available to the server computing device during the workflow process. For example, a workflow control device 106 may determine that, during a workflow process, a server computing device 106 will require access to a certain device driver within a software image. If such a software image is not yet available, the workflow control device may cause creation of such a software image prior to instructing the server computing device 106 to process the determined workflow.

After having received a workflow, the server computing device 106 may process the received workflow in order to determine a workflow stage to process. Illustratively, a workflow may comprise multiple workflow stages. One or more of the workflow stages may depend on other workflow stages having been previous completed, or may require a second workflow stage to be simultaneously processed. Based on analysis of the workflow, the server computing device 106 may select a first workflow stage to process. Though described herein with reference to the server computing device 106, in some embodiments, a workflow stage may be determined by the workflow control device 102 and transmitted to the server computing device 102. In such embodiments, the server computing device 102 may not be required to have knowledge of the complete workflow. In other embodiments, workflow stages may be determined at least partially by the resource control device 110A. For example, after completing a workflow stage by interacting with a resource control device 110A, the resource control device 110A may transmit a subsequent workflow stage to the server computing device 106.

After determining a workflow stage to process, the server computing device 106 may request access to a computing resource 130A required by the workflow stage. Though described herein with reference to a single computing resource, in some embodiments, a workflow stage may be dependent on multiple computing resources. In order to request access to the computing resource 130A, the server computing device 106 may contact a corresponding resource control device 110A. In some embodiments, the location of the resource control device 110A may be determined by communication with the computing resource 130A, with the workflow control device 102, or by broadcasting a request to locate the resource control device 110A.

In response to a request to access computing resource 130A, the resource control device 110A may determine an availability of the computing resource 130A. As described above, such availability may be determined according to a variety of metrics. By way of non-limiting example, such metrics may correspond to the number of server computing devices 106 or other devices accessing the computing resource 130A, the available network bandwidth on computing resource 130A, the available random access or persistent memory on computing resource 130A, an available processing power of computing resource 130A, the success rate of interactions with the computing resource 130A (e.g., successful transmissions or interactions). In some embodiments, the resource control device 110A may further base availability of a computing resource 130A on expected future usage of any of the above metrics. Future use may be predicted based, for example, on the status of workflows being processed by other server computing devices 106. In still more embodiments, the availability of a computing resource 130A may reflect the stability of any of the above metrics. For example, the availability of a computing resource 130 may be determined such that the power use of the computing resource 130 remains near constant. In some embodiments, the availability of the computing resource 130A may further depend on an expected use of the computing resource 130A by the server computing device 106. Determination of availability of a computing resource will be described in more detail with respect to FIG. 4, below.

As described above, in some embodiments, the workflow control device 102 and the resource control device 110A may be configured to record data regarding use of a computing resource 130A. If such history has been recorded previously, the resource control device 110A may use this history to determine an expected future availability of the computing resource 130A and an expected use of the computing resource 130A by the server computing device 106. In addition, the resource control device 110A may record the received request, as well as any determination as to the availability of the computing resource 130A.

If the resource control device 110A determines that the computing resource 130A is available for use by the requesting server computing device 106, the resource control device 110A may return an indication to the server computing device 106 that access to the computing resource 130A is granted. Thereafter, the server computing device 106 may access the computing resource 130A in order to process the current workflow stage.

With reference to FIG. 2B, in a manner similar to FIG. 2A, an illustration is shown depicting processing of a resource-dependent workflow by a server computing device 106 of FIG. 1. As described above with reference to FIG. 2A, the server computing device 106 may request a workflow from the workflow control device 102, which in turn may return a workflow. The server computing device 106 may then determine a workflow stage to process, and request access to a corresponding computing resource from the resource control device 110A.

In the illustration as depicted in FIG. 2B, however, the resource control device 110A may not immediately return an indication of whether access to the computing resource 130A is granted. In this illustrative example, the server computing device 106 is configured, after receiving no response to a request to a resource control device 110A, to redirect requests to a proxy control device 120A. Such redirection may occur, for example, after a threshold number of requests to a resource control device 110A receive no reply, or after a time period elapses in which no response is received. As described above, redirection of requests to a proxy control device 120A may be beneficial in situations where requests to a resource control device 110A are themselves contributing to overloading a resource control device 110A.

After receiving a request to access computing resource 130A, the proxy control device 120A may retransmit that request to resource control device 110A. In order to prevent such requests from overloading the resource control device 110A, the proxy control device 120A may be configured to retransmit requests less frequently than a server computing device 106. In some embodiments, the proxy control device 120A may aggregate requests from multiple server computing devices 106 in order to forward one aggregate request to the resource control device 110A. Such an aggregate request may specify each server computing device 106 requesting access to the computing resource 130. In some embodiments, the proxy control device 120A may be given preferential treatment by the resource control device 110A. For example, requests from the proxy control device 120A may be prioritized by a resource control device 110A over requests received from server computing devices 106.

After successfully receiving a request to access a computing resource from the server computing device 106 via the proxy control device 120A, the resource control device 110A may determine an availability of the computing resource 130A in a manner similar to that discussed with respect to FIG. 2A, above. In this illustrative embodiment, the resource control device 110A may determine that access to the computing resource 130A should be granted. As such, an indication that access is granted is transmitted to the server computing device 106, which may thereafter access the computing resource 130A.

With reference to FIG. 2C, in a manner similar to FIGS. 2A and 2B, an illustration is shown depicting processing of a resource-dependent workflow by a server computing device 106 of FIG. 1. As described above with reference to FIG. 2A, the server computing device 106 may request a workflow from the workflow control device 102, which in turn may return a workflow. The server computing device 106 may then determine a workflow stage to process, and request access to a corresponding computing resource from the resource control device 110A. Subsequently, the resource control device 110A may determine an availability of the computing resource 130A in order to determine whether to grant access to the computing resource 130A, as described above in FIG. 2A.

As shown in FIG. 2C, in this illustrative embodiment, the resource control device 110A may determine that the server computing device 106 should not access the computing resource 130A. As such, the resource control device 110A may issue a command indicating that the server computing device should halt, at least temporarily, processing of the workflow stage. The server computing device 106 may, in turn, execute the received halt command.

In some embodiments, the halt command may include instructions to take one or more responsive actions. By way of non-limiting example, these responsive actions may include reducing or disabling functionality of the server computing device 106 in order to reduce power consumption. Further, as shown in FIG. 2C, a responsive action may include transmitting a status identified from the server computing device 106 to the resource control device 110A. In some embodiments, these status identifiers may be repeatedly transmitting, such that the resource control device 110A maintains an awareness of the status of the server computing device 106. These status identifiers may include such information as the identity of the server computing device 106 (e.g., a media access control address or an IP address), the status of a workflow being processed by the server computing device, the computing resource 130A required by that workflow process, or any other status information. In some embodiments, a status identifier may include less that the above information. For example, a ping transmitted from the server computing device 106 to the resource control device 110A may constitute a status identifier. Illustratively, the ping may signify that the server computing device 106 is awaiting access to the computing resource 130A.

As described above, in some embodiments, management of workflow processes may be facilitated by defining states of server computing devices 106. For example, an "invalid" state may signify a server computing device 106 that has not yet received a workflow. A "running" state may signify a server computing device 106 that is processing a workflow or workflow stage. A "pending" state may signify a server computing device 106 that is awaiting access to a computing resource 130A. This pending state may be associated with retransmitting a status identifier to the resource control device repeatedly over a period of time. A "parking" state may signify a server computing device 106 that is awaiting access to a computing resource 130A, repeatedly transmitting a status identifier, and that has reduced consumption of resources by reducing or disabling functionality of the server computing device 106 at least partially. A "dormant" state may signify a server computing device 106 that has powered off. In some embodiments, a server computing device 106 entering into a dormant state may be configured to notify the resource control device 110A, such that the resource control device 110A may cause the server computing device 106 to start when the computing resource 130A becomes available. Illustratively, the server computing device 106 may be configured to enter any of the above states based on specified criteria. In some embodiments, a halt command issued by the resource control device 110A may correspond to a command to enter one of the above states.

Figure 3:
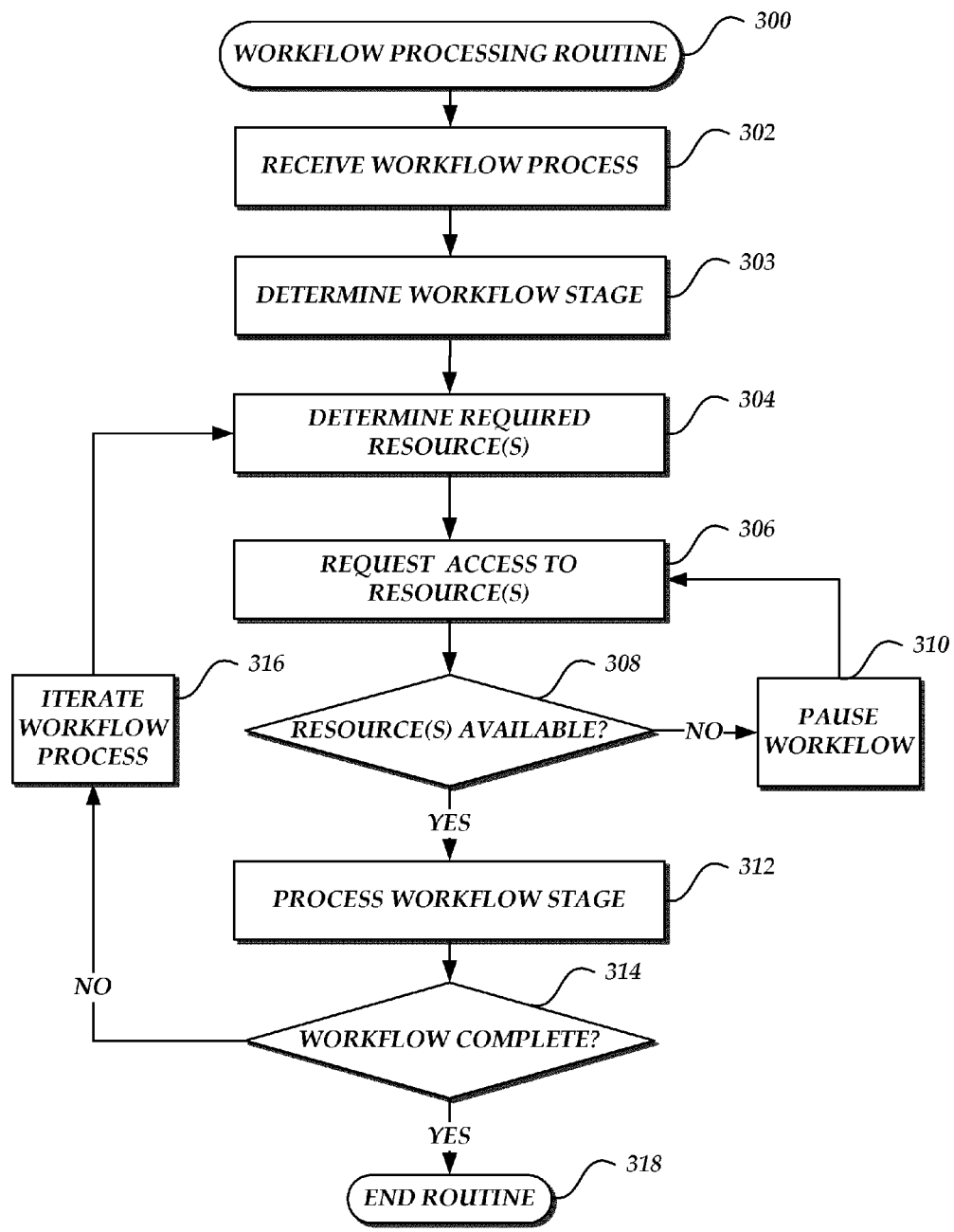
FIG. 3 is a flow-diagram illustrating a workflow processing routine for an individual server computing device of FIG. 1.

With reference now to FIG. 3, an illustrative flow-diagram depicting a routine 300 for processing a workflow of a server computing device is depicted. This routine may be carried out by, for example, a server computing device 106 of FIG. 1. At block 302, the server computing device 106 receives a workflow process. Such a workflow process may be received, for instance, from a workflow control device 102 of FIG. 1. At block 303, the server computing device 106 may determine a workflow stage of the received workflow process to execute. Such a determination may be based, for instance, on the dependencies of other workflow stages within the received workflow process. In other embodiments, determination of a workflow stage may be dependent on the computing resources 130 that are available or will be available for processing. In such embodiments, the server computing device 106 may be configured to query multiple resource control devices 110 in order to determine the availability of resources. As described above, in some embodiments, the workflow stage may be specified by a workflow control device 102, or by a resource control device 110. In such embodiments, block 303 may be omitted.

At block 304, the server computing device 106 may determine the resources necessary in order to process the determined workflow stage. For example, if the determined workflow stage corresponds to processing a software update, a computing resource 130 corresponding to a storage device that holds the software update may be required. At block 306, the server computing device 106 may request access to the computing resource 130 from a corresponding resource control device 110. One illustrative routine by which a resource control device 110 may manage requests for a computing resource 130 will be described in more detail with reference to FIG. 4, below.

At block 308, the server computing device 106 may receive an indication as to the availability of the computing resource 130. As described above, in some instances, the server computing device 106 may not receive such an indication. In some such embodiments, the server computing device 106 may be configured to retransmit an access request to the resource control device 110, or to repeatedly retransmit an access request for a specified number of times. Illustratively, when an indication as to the availability of the computing resource 130 is not received from the resource control device 110 within a specified period of time, the server computing device 106 may be configured to retransmit the access request some n number of times. In other embodiments, the server computing device 106 may be configured to request access to the computing resource 130 from a proxy control device 120, as described above with respect to FIG. 2B.

After a response is received as to the availability of the computing resource 130, if the computing resource 130 is determined not to be available, the server computing device 106 may pause the workflow process at block 310. As described above, pausing the workflow process may include taking responsive actions, such as reducing functionality of the server computing device 106, or repeatedly transmitting a status indicator to the resource control device 110. Further, in some embodiments, in addition to an indication that the computing resource 130 is not available, the server computing device 106 may receive instructions to enter a specified state. In such embodiments, the server computing device 106 may execute instructions to enter the specified state at block 310.

Thereafter, at the point at which the computing resource 130 becomes available to the server computing device 106, the server computing device 106 may continue processing the workflow at block 306. In some embodiments, the server computing device 106 may be configured to repeatedly request access to the computing resource 130 at block 306. In other embodiments, a resource control device 110 corresponding to the computing resource 130 may inform the server computing device 106 that the computing resource 130 has become available. In such embodiments, the server computing device 106 may continue at block 312.

At block 312, after it is determined that the computing resource device 130 is available, the server computing device 106 may process the workflow stage. For example, where the workflow stage involves receiving a software update from a storage location, the server computing device 106 may transfer an update file from the computing resource 130. Thereafter, the server computing device 106 may determine whether the workflow process is completed. If the process is not complete, the server computing device 106 may iterate to the next workflow stage at block 316, and repeat the routine from block 304. If the process is complete, the routine 300 may end at block 318.

As described above, in some embodiments, the server computing device 106 may not be aware of the overall workflow. In such embodiments, on completion of a workflow stage at 312, the server computing device 106 may request the next workflow stage from the workflow control device 102 or a resource control device 110. If no workflow stages remain, the workflow control device 102 or the resource control device 110 may return an indication that the workflow is complete.

Figure 4:
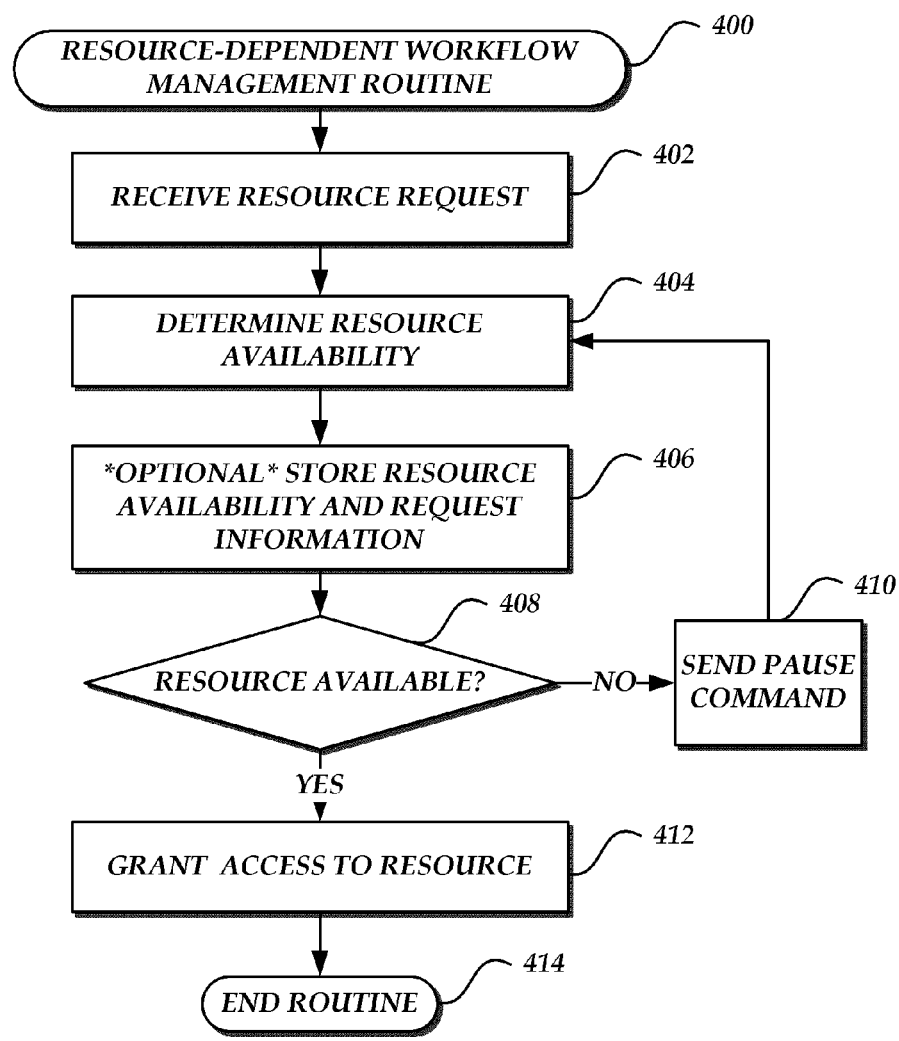
FIG. 4 is a flow-diagram illustrating a resource-dependent workflow management routine for a resource control device FIG. 1.

With reference now to FIG. 4, an illustrative flow-diagram depicting a routine 400 for managing resource-dependent workflows is depicted. This routine may be carried out by, for example, a resource control device 110 of FIG. 1. At block 402, the resource control device 110 receives a resource request corresponding to a computing resource 130 from a server computing device 106.

At block 404, the resource control device 110 may determine the availability or expected availability of the computing resource 130. Illustratively, availability of a computing resource 130 may correspond to a measurement of one or more performance metrics of the computing resource 130. For example, such metrics may correspond to available network or other bandwidth of the computing resource 130, to available processing power, persistent or transient memory of the computing resource 130, or power consumption of the computing resource 130. In some embodiments, a performance metric may correspond to the response time of a computing resource 130. In still more embodiments, availability of a computing resource 130 may be determined at least in part based on the number of server computing devices 106 accessing the computing resource 130. For example, a maximum number of server computing devices 106 that may simultaneously access a computing resource 130 may be specified. In these embodiments, the resource control device 110 may modify this maximum number of server computing devices 106 based on other determinations of availability. For example, if the computing resource 130 is being accessed by the specified maximum number of server computing devices, but otherwise has a high availability, the resource control device may increase this maximum number of server computing devices 106. Conversely, when a lower number of server computing devices 106 are accessing a computing resource 130, but availability metrics drop, the resource control device 110 may decrease this maximum specified number.

As described above, in some embodiments, historical information as to the availability of computing resources 130 may be recorded. In these embodiments, such historical information may be used to determine an available of a computing resource 130. For example, the resource control device 110 may utilize such history to determine the previous availability of the same or similar computing resource 130 under conditions similar to any current operating conditions. In some embodiments, such historical data may be used to check a determined availability of a computing resource 130. For example, where the computing resource 130 has been determined to be available for use by a server computing device 130, but similar historical situations reflect that making the computing resource 130 available to the server computing device would result in instability, the computing resource 130 may be determined to be unavailable.

Optionally, at block 406, the resource control device 110 may record information corresponding to the received request and to the determined availability. As described above, this information may be subsequently utilized by the resource control device 110 or another resource control device 110 in order to determine the availability or future availability of a computing resource 130. Still further, such historical data may be used to determine potential faults in one or more computing resources 130. For example, historical data may indicate that the computing resource 130 should have a certain predicted level of availability. However, in practice, the computing resource 130 may not reach the predicted level of availability. Such disparity may indicate an issue with the computing resource 130.

Though described herein with reference to the resource control device 110, in some embodiments, a separate computing device may record historical computing resource access data. In some embodiments, such a separate computing device may further determine the availability of a computing resource based on that availability.

At block 408, if the requested computing resource 130 is determined not to be available, the resource control device 110 may transmit a command to the requesting server computing device 106, such as a pause command or a command to halt a workflow stage. As described above, in some embodiments, such a command may include responsive actions that a server computing device 106 should execute. In other embodiments, such a command may include a state that the server computing device 106 should enter into.

Illustratively, a resource control device 110 may determine such a state or responsive actions based on the determined availability of the computing resource 130, the expected resource usage by the server computing device 106, or other factors. For example, where a computing resource 130 is unavailable, but expected to be available in the near future, the resource control device 110 may instruct the server computing device 106 to remain fully functional, and to transmit status indicators requesting access to the computing resource 130. Where a computing resource 130 is unavailable and expected to be unavailable for more than a certain period of time, the resource control device 110 may instruct the server computing device 106 to reduce or disable some amount of functionality in order to save computing power. This may correspond to instructing the server computing device 106 to ending a "parked" state. When a computing resource 130 is unavailable and expected to be unavailable for an extending period of time, the resource control device 110 may instruct the server computing device 106 to power down, which may correspond to entering a "dormant" state.

In some embodiments, after a command to halt a workflow process is sent, the resource control device 110 may continually monitor the availability of the computing resource 130 at block 404. In other embodiments, the resource control device 110 may instruct the server computing device 106 to request access to the computing resource 130 at some point in the future, and may not monitor an availability of the computing resource 130. In some such embodiments, the routine 400 may therefore end.

If, at block 408, the computing resource 130 is determined to be available to the server computing device 106, the resource control device 110 may, at block 412 transmit a command to the server computing device 106 that access to the computing resource 130 is granted. Such a command may correspond to placing the server computing device 106 in a "running" state. Thereafter, the server computing device 106 may process the workflow stage as described above with reference to FIG. 3, and the routine 400 may end at block 414.

In some embodiments, a resource control device 110 may, subsequent to processing a routine such as routine 400, continue to monitor a computing resource 130 in order to determine the computing resource 130's future availability or to modify the resource control devices 110 information regarding that availability. For example, in some embodiments, availability to a computing resource may be limited to a specified threshold number of server computing devices 106 that may access a computing resource 130 at any given point. In these embodiments, a resource control device 110 may monitor other availability metrics of a computing resource 130, such as available processing power, bandwidth, or memory in order to determine whether that threshold number of accessing server computing devices 106 should be modified. Still further, a resource control device 110 may monitor the number or percentage of successful interactions with the computing resource, the amount of data loss when communicating with the computing resource 130, or any other metric that may determine the availability of the computing resource 130 to facilitate additional server computing devices 106. Illustratively, if a computing resource 130 is being accessed by the specified maximum number of server computing devices 106, but has the ability to service at least one additional server computing device 106, the resource control device 110 may increase the specified maximum number of simultaneous accessing server computing devices 106. Alternatively, if a computing resource 130 is being accessed by less than the maximum number of server computing devices 106, but is low on an availability metric (e.g., available bandwidth, processing power, memory or storage), the maximum number of accessing server computing devices 106 may be lowered.

Figure 5:
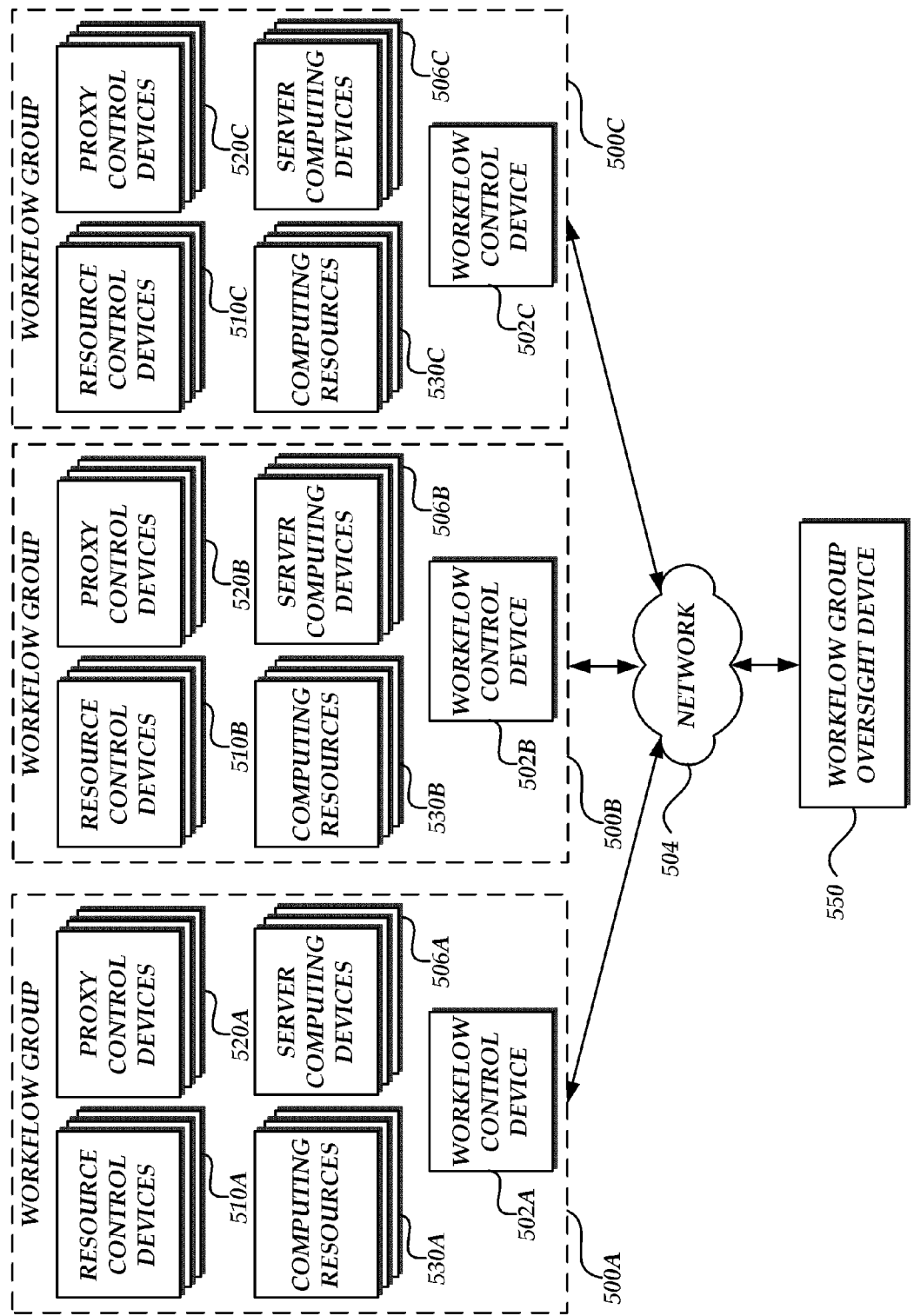
FIG. 5 is a block diagram illustrating an multiple workflow groups of FIG. 1 in association with a workflow group oversight device.

FIG. 5 is a block diagram illustrating an embodiment of a multiple workflow group environment. Illustratively, such an environment may include multiple workflow groups, such as workflow groups 500A-C. Each workflow group may correspond, for example, to a workflow group 100 of FIG. 1. As such, each workflow group may include one or more workflow control devices 502A, resource control devices 510 (corresponding to resource control devices 110 of FIG. 1), proxy control devices 520 (corresponding to resource control devices 120 of FIG. 1), computing resources 530 (corresponding to computing resources 130 of FIG. 1), and server computing devices 506 (corresponding to computing resources 506 of FIG. 1). These workflow groups 500 may be in communication via a network 504. In some embodiments, each workflow group 500 may correspond to a specific region or location, such as a city, state, country, or continent. In other embodiments, workflow groups may be separated by other physical or logical attributes. Though depicted herein as three workflow groups 500, any number of workflow groups may be in communication and form a multiple workflow group environment.

Communication of workflow groups may be beneficial in order to allow server computing devices 506 from a first workflow group, such as workflow group 500A, to communicate with resource control devices 510 and computing resources 530 from other workflow groups, such as resource control devices 510B and computing resources 530B of workflow group 520B. Illustratively, when a computing resource 530A becomes overloaded, server computing devices 506A may request access to computing resources 530B of workflow group 500B. As such, multiple workflow groups may work together to supplement overloaded computing resources 530.

Multiple workflow groups 500 may work together through a variety of mechanisms. For example, in some embodiments, server computing devices 506 from a first workflow group may be configured to automatically contact resource control devices 510 from another workflow group when they are unable to access a computing resource. In other embodiments, resource control devices 510 or proxy control devices 520 may be configured to redirect requests to another available workflow group when a computing resource 130 becomes over utilized. In still more embodiments, resource control devices 510 from various workflow groups 500 may be in communication to coordinate and determine mitigating actions when computing resources 530 are overloaded. For example, resource control devices 510 from various workflow groups 500 may associate into a "council" of resource control devices 510. These councils may be formed by all resource control devices 510, or by only resource control devices 510 which correspond to similar computing resources 530. Such councils may use distributed decision making techniques in order to overcome issues of overloaded computing resources 530. Examples of such distributed decision making techniques will be discussed in more detail with reference to FIG. 6, below.

In some embodiments, the workflow groups 500 may be in communication with a workflow group oversight device 550. Such a workflow group oversight device 550 may enable human oversight of mitigating decisions made by resource control devices 510. In this manner, a human overseer may be able to accept or reject these mitigating decisions. Further, a workflow group oversight device 550 may enable a human overseer to propose mitigating decisions to resource control devices 510, or to impose mitigating actions manually.

Figure 6:
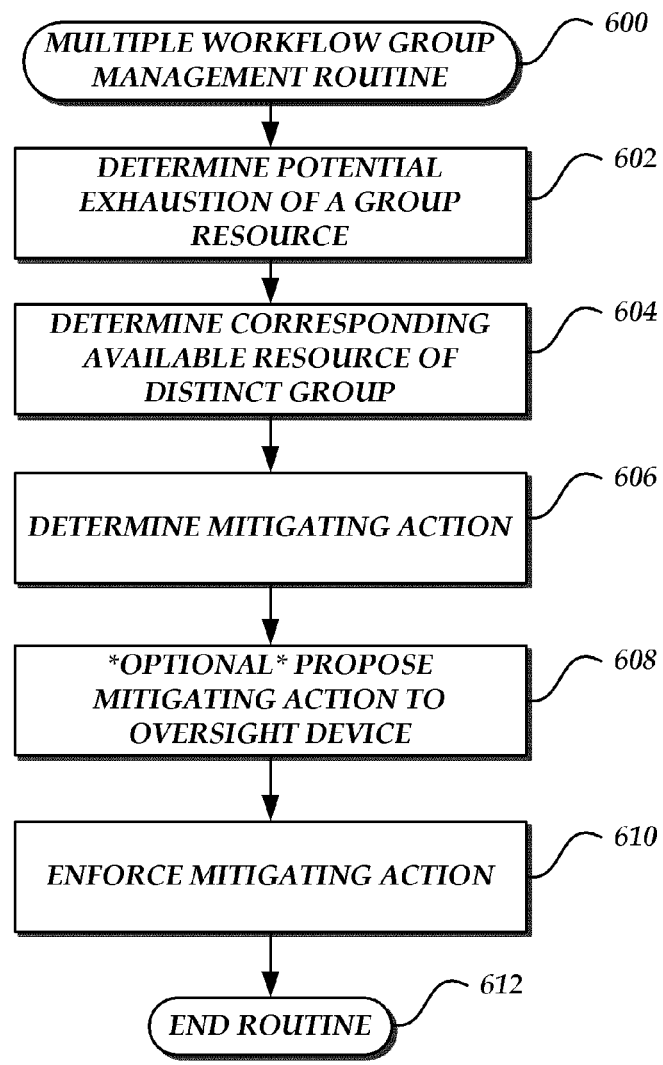
FIG. 6 is a flow-diagram illustrating a multiple group workflow management routine for one or more workflow control devices of FIG. 5.

With reference now to FIG. 6, an illustrative flow-diagram depicting a routine 600 for managing a multiple a multiple workflow group environment is depicted. This routine may be carried out, for example, by one or more a resource control devices 510 of FIG. 5. At step 602, a resource control device 510 may determine that corresponding computing resource 530 is overloaded, exhausted, or otherwise unavailable, or is potentially in danger of becoming unavailable. Such unavailability may occur, for example, during period of peak use of the workflow group 500 including the computing resource 530, because of a failure in one or more devices of the workflow group 500, because of a power outage or natural disaster occurring near workflow group 500, or for various additional or alternative reasons.

Thereafter, at block 604, the resource control device 530 may determine availability of similar computing resources 530 from other distinct workflow groups 500. For example, in some embodiments, a resource control device 510 may be configured to directly inspect or query computing resources 530 from other workflow groups 500. In other embodiments, a resource control device 510 may be configured to query other resource control devices 510 which correspond to the similar computing resources 530 in order to determine their availability.

Based on the availability of similar computing resources 530, the resource control device 510 may at block 606 determine a mitigating action. In some instances, where similar computing resources are unavailable, or near their limit of availability, no mitigating action may be available. In such instances, the routine 600 may be configured to notify a human operator, such as by transmitting a notification to a workflow group oversight device 550. In other instances, the resource control device 510 may determine that some requests for a specific computing resource 530 of a first workflow group 500 could be redirected to similar computing resources 530 of a distinct workflow group 500.

As described above, in some embodiments, a resource control device 510 may be configured to determine such mitigating actions without interaction with other resource control devices 510. In other embodiments, multiple resource control devices 510 may interact to collectively determine a mitigating action. Such collective determination may use any of a variety of distributed decision making techniques and algorithms. For example, resource control devices 510 from various workflow groups 500 may associate into a "council" of resource control devices 510. These councils may be formed by all resource control devices 510, or by only resource control devices 510 which correspond to similar computing resources 530. Such councils may use distributed decision making techniques in order to overcome issues of overloaded computing resources 530. For example, a council may be composed of a resource control device 510A, 510B, and 510C of FIG. 5. The resource control device 510A of workflow group 500A may determine that a computing resource 530A is overloaded, unavailable, or predicted to become overloaded or unavailable in the future. The resource control device 510A may propose to such a council of resource control devices 510 that a certain amount of requests for the computing resource 530A be redirected to computing resource 530B or 530C. Resource control device 510B and 510C may determine their availability of corresponding computing resources 530B and 530C and collectively agree to or reject such a proposal. In some instances, computing resources 530B and 530C may also be overloaded, or in danger of becoming overloaded. As such, the resource control devices 510 may collectively decide that redirection of access requests from group 500A to groups 500B or 500C should not be allowed, since corresponding computing resources 530 are not available.

In some embodiments, decisions of one or multiple resource control device 510 may have continuing future effect. Illustratively, in the example above, where resource control device 510A is requesting access to computing resources 530B and 530C, a decision to not allow such access may be effective for a set duration of time. For instance, requests from resource control device 510A to access computing resources 530B and 530C may be automatically denied for some specified period of time. In some embodiments, resource control devices 510 may be configured to prevent transmission of such access requests during the specified period of time. Such prevention may, for example, reduce the overall number of group access requests in situations where a large number of computing resources 530 are overloaded or in danger of becoming overloaded.

At block 606, if a mitigating action has been determined, the mitigation action may optionally be proposed to an oversight device, such as workflow group oversight device 550 of FIG. 5. As described above, such a workflow group oversight device 550 may be configured to accept or reject mitigating action proposals based on the input of a human operator. If the workflow group oversight device 550 approves the mitigating action, the routine may continue at block 610. Otherwise, the routine may end at block 612.

At block 610, the determined mitigation action is enforced by the resource control devices 510. For example, requests from server computing devices 506 from a first workflow group 500 to access computing resources 530 from a first workflow group 500 may be redirected to corresponding resource control devices 510 of a second workflow group 510. After a mitigating action has been enforced, the routine 600 may end at block 612.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing resource dependent workflows, the method comprising:
   receiving, at a resource control computing device, a set of requests for authorization to access a computing resource associated with at least one workflow stage, wherein each of the set of requests is received from one of a plurality of computing devices, and wherein the resource control device is configured to allocate access of the plurality of computing devices to the computing resource during implementation of a resource dependent workflow by the plurality of computing devices;
   determining that a level of availability of the computing resource is below a threshold level, wherein the level of availability of the computing resource is determined in accordance with an allocation of the implementation of the at least one workflow stage to the plurality of computing devices;
   transmitting to a first computing device of the plurality of computing devices instructions to at least temporarily pause the at least one workflow stage;
   receiving a status identifier from the first computing device, wherein the status identifier indicates that the first computing device is awaiting authorization to access the computing resource;
   determining that a level of availability of the computing resource is above a threshold level; and
   transmitting to the first computing device instructions to process the at least one workflow stage.

2. The computer-implemented method of claim 1, wherein receiving the status identifier from the computing device comprises receiving an Internet Control Message Protocol (ICMP) echo request.

3. The computer-implemented method of claim 1, wherein receiving the status identifier from the first computing device comprises receiving at least one of a media access control address or an internet protocol address of the first computing device.

4. The computer-implemented method of claim 1, wherein transmitting to the first computing device instructions to at least temporarily pause the at least one workflow stage further comprises transmitting instructions to enter a defined processing state.

5. The computer-implemented method of claim 4, wherein transmitting instructions to enter a defined processing state further comprises transmitting instructions to transmit a status identifier.

6. The computer-implemented method of claim 1 further comprising, for each period within a set of periods, receiving an additional status identifier from the first computing device indicating that the first computing device is awaiting access to the computing resource.

7. A system for managing resource dependent workflows, the system comprising:
   at least one resource control device associated with a computing resource, wherein the at least one resource control device is configured to allocate access of a plurality of computing devices to the computing resource during attempted implementation of a resource dependent workflow by the plurality of computing devices, and wherein the at least one resource control device is configured to:
      receive, from a first computing device of the plurality of computing devices, a request for authorization to access the computing resource, wherein the computing resource is associated with at least one workflow stage of the resource dependent workflow;
      determine that a level of availability of the computing resource is below a threshold level, wherein the level of availability of the computing resource is determined in accordance with an allocation of the implementation of the at least one workflow stage by the plurality of computing devices;
      transmit to the first computing device instructions for the first computing device to at least temporarily pause the at least one workflow stage;
      receive a status identifier from the first computing device, wherein the status identifier indicates that the first computing device is awaiting authorization to access the computing resource;
      determine that a level of availability of the computing resource is above a threshold level; and
      transmit to the first computing device instructions for the first computing device to process the at least one workflow stage.

8. The system claim 7, wherein the status identifier comprises an Internet Control Message Protocol (ICMP) echo request.

9. The system claim 7, wherein the status identifier comprises at least one of a media access control address or an internet protocol address of the first computing device.

10. The system claim 7, wherein the instructions for the first computing device to at least temporarily pause the at least one workflow stage further comprise instructions for the first computing device to enter a defined processing state.

11. The system claim 7, wherein the instructions for the first computing device to at least temporarily pause the at least one workflow stage further comprise instructions for the first computing device to transmit the status identifier.

12. The system claim 7, wherein the at least one resource control device is further configured to, for each time period within a set of time periods, receive an additional status identifier from the first computing device indicating that the first computing device is awaiting access to the computing resource.

13. The computer-implemented method of claim 1, wherein transmitting to the first computing device instructions to process the at least one workflow stage comprises transmitting to the first computing device instructions to enter a defined processing state.

14. The system claim 7 further comprising at least one computing device of the plurality of computing devices, wherein the at least one computing device is configured with specific computer-executable instructions to:
   receive the resource dependent workflow;
   determine the at least one computing resource associated with resource dependent workflow;
   transmit the request for authorization to access the computing resource to the at least one resource control device;
   receive, from the at least one resource control device, the instructions to at least temporarily pause the at least one workflow stage; and
   for each time period within a set of time periods, transmit the status identifier indicating that the at least one computing device is awaiting authorization to access the at least one computing resource.

15. A non-transitory storage media comprising computer-executable instructions that, when executed by a processor of a resource control device, cause the resource control device to:
   receive, from a first computing device of the plurality of computing devices, a request for authorization to access a computing resource associated with the resource control device, wherein access to the computing resource is associated with implementation of at least one workflow stage of a resource dependent workflow, and wherein the at least one resource control device is configured to allocate access of a plurality of computing devices to the computing resource during attempted implementation of a resource dependent workflow by the plurality of computing devices;
   determine that a level of availability of the computing resource is below a threshold level, wherein the level of availability of the computing resource is determined in accordance with an allocation of the implementation of the at least one workflow stage by the plurality of computing devices;
   transmit to the first computing device instructions for the first computing device to at least temporarily pause the at least one workflow stage;
   receive a status identifier from the first computing device, wherein the status identifier indicates that the first computing device is awaiting authorization to access the computing resource;
   determine that a level of availability of the computing resource is above a threshold level; and
   transmit to the first computing device instructions for the first computing device to process the at least one workflow stage.

16. The non-transitory storage media of claim 14, wherein the status identifier comprises an Internet Control Message Protocol (ICMP) echo request.

17. The non-transitory storage media of claim 14, wherein the status identifier includes at least one of a media access control address or an internet protocol address of the first computing device.

18. The non-transitory storage media of claim 14, wherein the instructions to at least temporarily pause the at least one workflow stage further comprise instructions for the first computing device to enter a defined processing state.

19. The non-transitory storage media of claim 14, wherein the instructions to enter a defined processing state further comprises instructions to transmit the status identifier.

20. The non-transitory storage media of claim 14, wherein the computer-executable instructions further cause the resource control device to receive, during each period within a set of periods, an additional status identifier from the first computing device indicating that the first computing device is awaiting access to the computing resource.

21. The non-transitory storage media of claim 14, wherein the instructions for the first computing device to process the at least one workflow stage further comprises instructions for the first computing device to enter a defined processing state.

\* \* \* \* \*